Patented June 16, 1953

2,642,337

UNITED STATES PATENT OFFICE 2,642,337

METHOD OF CONVERTING CRYSTALLINE ALUMINA HYDRATE TO ALPHA ALUMINA

James W. Newsome, Belleville, Ill., assignor to Aluminum Company of America, Pittsburgh, Pa., a corporation of Pennsylvania No Drawing. Application June 9, 1948, Serial No. 32,037

3 Claims. (Cl. 23—142)

This invention relates to the production of alpha alumina (corundum), and relates particularly to converting alumina hydrate to such alumina.

Several crystalline forms of alumina have been identified and reported in the literature. Although some of those forms can be produced by heating crystalline alumina hydrate at much lower temperatures, alpha alumina is ordinarily produced commercially by heating alumina hydrate at temperatures well above 1000° C. Experiments have also been reported in the literature which describe converting alumina hydrate to alpha alumina at lower temperatures than 1000° C. by heating the alumina hydrate under pressure, but the pressures specified have been too high for the procedures to be practical for large scale commercial operation.

It is the object of this invention to provide a practical procedure whereby alumina hydrate can be converted to alpha alumina at relatively low temperatures.

I have discovered that crystalline alumina hydrate such as alumina trihydrate ($Al_2O_3.3H_2O$) or alumina monohydrate ($Al_2O_3.H_2O$), can be converted to alpha alumina by heating it in the presence of steam at a pressure below 2500 pounds p. s. i., and at temperatures as low as 400° C. The factors of temperature, pressure, and time of treatment are inter-related in employing such a proceduce, in that the higher the temperature at which the alumina hydrate is heated the more rapidly the conversion to alpha alumina takes place at a given steam pressure. Likewise, the higher the steam pressure at a given temperature, the more rapidly the conversion is effected. For example, at 400° C. and a steam pressure of about 2400 p. s. i., the conversion takes place very slowly, whereas at temperatures above 450° C. the conversion takes place much more rapidly, even at steam pressures below 1000 pounds p. s. i.

The particular temperature and pressure conditions most desirable depend on a number of factors, such as the steam pressures that the equipment in which the conversion is effected will stand under the heating temperature involved, the speed at which it is desired to carry out the conversion, and the physical state of the body of alumina hydrate being treated. In general, heating the alumina hydrate at from 450–550° C. in steam at pressures of from 350–1000 pounds p. s. i. is preferable, for under such conditions the conversion to alpha alumina can be carried out rapidly, and relatively inexpensive equipment capable of withstanding such pressures at the temperature mentioned is readily obtainable. A heating period of from 15 minutes to 2½ hours (disregarding the time employed in bringing the temperature and pressure to the desired level) is ordinarily sufficient to effect the conversion, although the particular heating time to be used not only depends on the temperature and pressure conditions employed, but also on the size of the alumina hydrate particles and how completely it is desired to convert the alumina hydrate to alpha alumina, rather than to some other form of alumina, such as gamma alumina.

The steam atmosphere required in carrying out the invention can be supplied, at least in part, by the water vapor liberated in the heating chamber from the alumina hydrate in the course of the heating operation. The process can be carried out in any apparatus in which the desired pressure and temperature can be maintained. However, it is preferable to agitate the particles of alumina hydrate during the process in order to secure uniform heating and contact with steam as by means of mechanical stirring, or by rotating the pressure chamber. Alternatively, the particles can be agitated by steam itself or other vapor introduced into the pressure chamber, which may even be fed into the lower part of the pressure chamber sufficiently rapidly to keep the particles being treated suspended in a turbulent mass.

The following example illustrates the operation of the invention. A quantity of alpha alumina trihydrate of a particle size varying between 100 and 300 mesh was placed in a cylindrical, horizontally disposed autoclave equipped with a pressure gauge and a relief valve, and was heated at 500° C. for one hour, after raising the temperature to that point at a uniform rate in 1½ hours. The autoclave was rotated about its axis intermittently during the heating operation. The steam pressure in the autoclave was allowed to rise to about 500 pounds per square inch as the temperature was being raised, and was then kept at that point during the remainder of the heating operation. When the material heated as described was removed from the autoclave and dried to remove free water, substantially all of it had been converted to alpha alumina.

I claim:

1. The method of converting crystalline alumina hydrate to alpha alumina, comprising heating the alumina hydrate in contact with steam at a pressure of 350–2500 pounds per square inch and at a temperature of 400–550° C.

2. The method of converting crystalline alumina hydrate to alpha alumina, comprising heating the alumina hydrate at a temperature of 450–550° C. in contact with steam at a pressure of 350–1000 pounds per square inch.

3. The method of converting alumina trihydrate to alpha alumina, comprising heating the alumina trihydrate in contact with steam at a pressure of 350–2500 pounds per square inch and at a temperature of 400–550° C.

JAMES W. NEWSOME.

References Cited in the file of this patent

UNITED STATES PATENTS

| Number | Name | Date |
|---|---|---|
| 724,251 | Blackmore | Mar. 31, 1903 |
| 1,950,883 | Gitzen | Mar. 13, 1934 |
| 2,377,547 | Fuchs | June 5, 1945 |
| 2,378,155 | Newsome | June 12, 1945 |

OTHER REFERENCES

Mellor, Comprehensive Treatise on Inorganic and Theoretical Chemistry, Longmans, Green, London (1924), vol. V, page 259.